Patented July 18, 1950

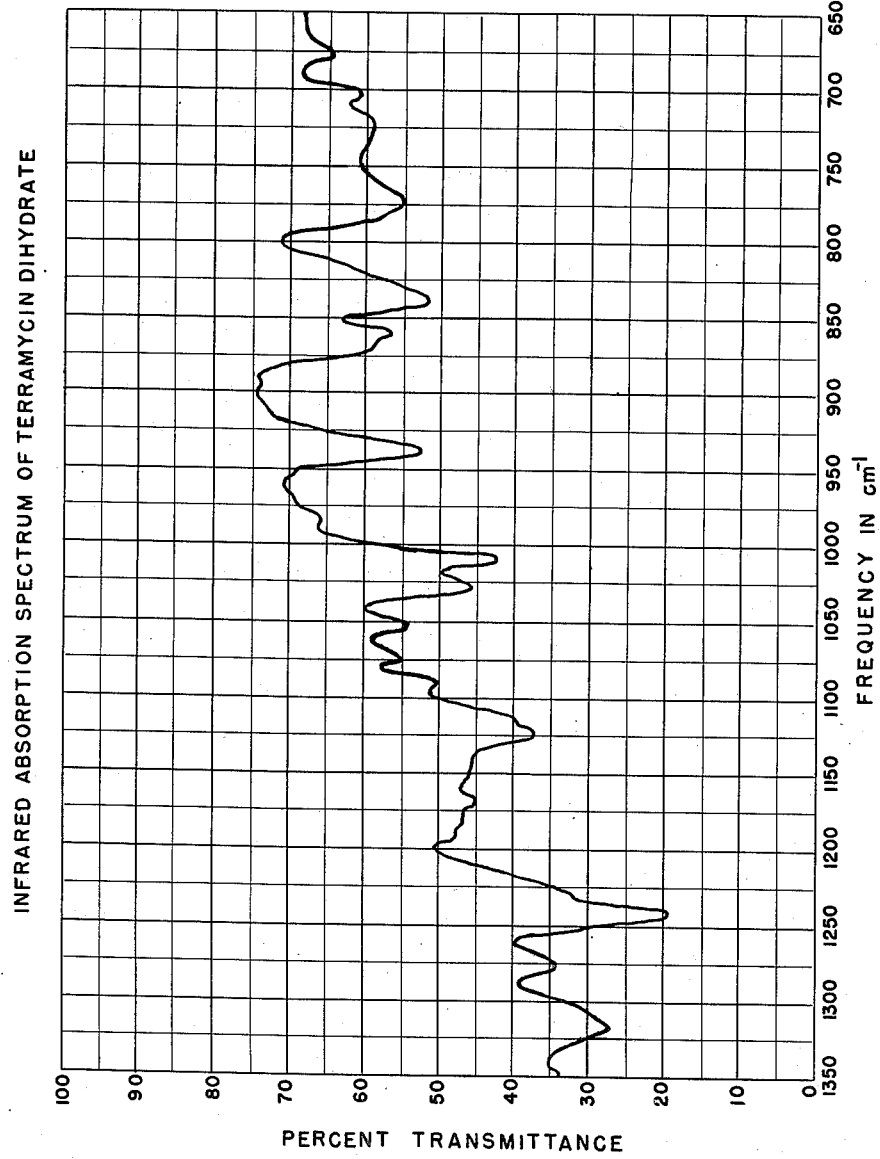

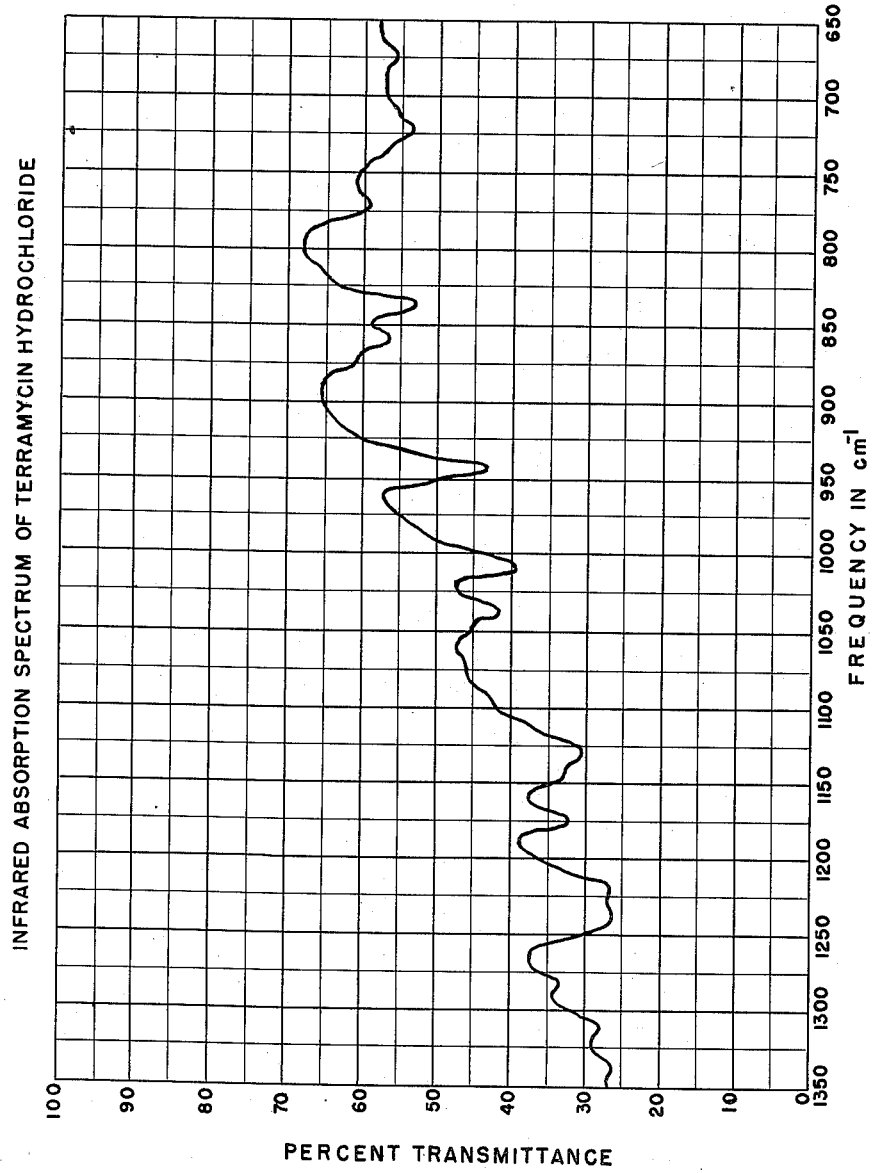

2,516,080

UNITED STATES PATENT OFFICE 2,516,080

TERRAMYCIN AND ITS PRODUCTION

Ben A. Sobin, New York, Alexander C. Finlay, Long Island City, and Jasper H. Kane, Garden City, N. Y., assignors to Chas. Pfizer & Co., Inc., New York, N. Y., a corporation of New Jersey Application November 28, 1949, Serial No. 129,868

15 Claims. (Cl. 167—65)

This invention is concerned with a new and useful antibiotic, called Terramycin, and with its production. More particularly, it relates to processes for its production by fermentation, methods for its recovery and concentration from crude solutions including the fermentation broths, purification thereof, and the production of its salts. The invention embraces the antibiotic and its salts in dilute solutions, as crude concentrates, and in pure crystalline form.

The present application is a continuation-in-part of our application Serial No. 121,233, filed October 13, 1949, and now abandoned.

Our novel antibiotic is formed during the cultivation under controlled conditions of a hitherto undescribed species of microorganism which we have called *Streptomyces rimosus*. The description of this organism, following the key of Bergey's "Manual of Determinative Bacteriology," sixth edition, pages 929–933, is set forth in the following. A culture of the living organism has been deposited with the Fermentation Division of the Northern Regional Research Laboratory at Peoria, Illinois, and has been added to its permanent collection of microorganisms as NRRL–2234.

The cultural characteristics of this species, near *S. albus* but differing in several particulars, based on isolate Number S3279, are given below in tabular form. (The colors, where R is written, are those of Ridgway, Color Standards and Nomenclature). Readings are based on six tubes or plates.

*Streptomyces rimosus* sp. nov.

| Medium | Amount of Growth | Color | | Remarks |
|---|---|---|---|---|
| | | Aerial Mycelium and Spores | Soluble Pigment | |
| Gluecose - asparagine agar plates. | Moderate to good, mostly submerged. | Between white and Pallid Quaker Drab (R). | Very faint yellowish. | Colony flat; edge irregular; surface smooth; sporulation slight, aerial mycelium slight, reverse near yellow. Ocher (R) in center, Colonial Buff (R) at edge; spirals very numerous; conidia in chains, 0.6–0.7 x 0.8–1.4 microns, short-cylindrical. Dilution plates: colonies essentially all alike. Isolated colonies scurfy from scattered systems of large clusters of spirals; odor earthy. |
| Gelatin | Moderate | White | None | Moderate liquefaction. |
| Litmus milk: | | | | |
| 28° C | Good, thick pellicle | Grayish-white | Lower part of tube lighter than control. | No hydrolysis or peptonization. pH unchanged. |
| 37° C | Very good | Grayish-white | Upper part of liquid nearly black. | No hydrolysis or peptonization. pH changed from 6.1 to 6.6–7.02. |
| Glucose agar | Moderate, dry, surface cracked from continued growth of vegetative hyphae. | Lighter than Pallid Mouse Gray (R). | Yellowish brown | Reverse near Zinc-Orange (R) and Ochraceous Orange (R). |
| Nutrient agar | Poor | No aerial mycelium waxy. | Very faint yellowish. | Reverse near chamois and Honey Yellow (R). |
| Potato plug | Moderate, wrinkled | Whitish to Pallid Quaker Drab (R). | Slightly yellowish brown. | Mycelium near Ochraceous Tawny (R). |
| Calcium malate | Poor, flat | No aerial mycelium; colony near Mars Yellow (R). | None | |
| Starch plates | Poor, thin | Very little aerial mycelium; colony near Light Cinnamon Drab (R). | do | Hydrolysis slight. |
| Synthetic agar | None | | | |
| Cellulose | do | | | |
| Emerson's | Moderate to good; rough; surface split into many small pieces eventually. | White to Pallid Quaker Drab (R); colony en masse near Honey Yellow to Zinc Orange or Ochraceous Orange (R). | Pale Yellowish (R) brown. | Reverse near Zinc-Orange. |
| Dextrose nitrate broth. | Moderate with a pellicle | | Yellow | Nitrate reduction from weak to strong in different tubes. |

This species differs from *S. albus* in the following ways:

| S. albus (Rossi Doria emend. Krainsky) Waksman and Henrici | S. rimosus |
|---|---|
| 1. Aerial mycelium abundant. | 1. Aerial mycelium scanty. |
| 2. Aerial mycelium white. | 2. Aerial mycelium not pure white but near Pallid Quaker Drab (R). |
| 3. No mention of cracking of colony. | 3. When vigorous growth occurs, the colonies become cracked at first circumferentially, then over entire surface so that the sporiferous layer becomes cracked into small pieces that become separated from one another by continued growth upward of the underlying hyphae. |
| 4. Milk peptonized after coagulation. | 4. Milk not hydrolyzed or peptonized. |
| 5. On synthetic agar growth abundant, spreading. | 5. No growth on synthetic agar. |
| 6. Colonies on potato white. | 6. Mycelium is near Ochraceous Tawny (R). |

The specific name, from *rimosus*, meaning cracked, was chosen to refer to the fissured, cracked appearance of some colonies.

It is to be understood that for the production of Terramycin we do not wish to limit ourselves to this particular organism or to organisms fully answering the above description which is given merely for illustrative purposes. We especially wish to include the use of organisms which are mutants produced from the described organism by mutating agents such as X-radiation, ultraviolet radiation, nitrogen mustards, etc.

Terramycin shares with antibiotics produced by other Streptomyces in the property of having a wide antibiotic spectrum, particularly among the Gram-negative bacteria. Among the organisms whose growth is inhibited by very low concentrations of Terramycin are the following: *Aerobacter aerogenes*, Streptothricin-resistant *Aerobacter aerogenes*, *Salmonella paratyphi A*, Streptomycin-resistant *Salmonella paratyphi A*, *Salmonella paratyphi B*, Chloramphenicol-resistant *Salmonella paratyphi B*, *Escherichia coli*, *Pseudomonas aeruginosa*, *Staphylococcus albus*, *Staphylococcus aureus*, *Bacillus subtilis*, *Bacillus mycoides*, *Eberthella typhosa*, *Shigella paradysenteriae*, *Klebsiella pneumoniae*, and *Salmonella pullorum*.

The following table shows the comparative spectra of various Streptomycin, Streptothricin, Chloramphenicol, Aureomycin and Terramycin preparations. The potency of the various antibiotic preparations used are expressed in two ways: (1) *E. coli* dilution units and/or (2) Chloramphenicol units per milligram. By *E. coli* dilution units (CDU) per milligram, we mean the maximum volume of nutrient broth in milliliters to which one milligram of the antibiotic preparation (which may be of varying degrees of purity) may be diluted and, when inoculated with $10^{-6}$ dilution of an 18 hour culture of *E. coli* grown under the same conditions, still show no bacterial growth at the end of 18 hours' incubation at 37° C. By Chloramphenicol units (Chloro. u.) per milligram we mean the result of an assay using as a test organism *Klebsiella pneumoniae*, PCI 602, and as a test medium Baltimore Biological Laboratory antibiotic assay broth prepared according to the Food and Drug Administration formula for Streptomycin turbidimetric assay broth. The method of test is that of McMahon, J. R. (J. Biol. Chem., vol. 153, pages 249–258, April 1944), using as a standard crystalline Chloramphenicol at 10 mg. per liter.

TABLE I

*Concentrations of antibiotic preparation per milliliter of nutrient agar required to prevent bacterial growth on the surface of Petri dishes*

| | Terramycin [1] | | Aureomycin [2] | | Chloroamphenicol [3] | | Streptothricin, [4] CDU/mg. | Streptomycin, [5] CDU/mg. |
|---|---|---|---|---|---|---|---|---|
| | CDU/mg. | Chloro. u./mg. | CDU/mg. | Chloro. u./mg. | CDU/mg. | Chloro. u./mg. | | |
| | 20 | 65 | 3,840 | 7,500 | 1,000 | 1,000 | 2,200 | 4,000 |
| | CDU | Chloro. u. | CDU | Chloro. u. | CDU | Chloro. u. | CDU | CDU |
| E. typhosa 344 | 1–2 | 6 | 4–10 | 7.5 | 1–5 | <5 | 2–6 | 12–20 |
| Ps. aeruginosa 173 | 20–40 | >65 | 192–384 | 375–750 | 100–1,000 | 100 | 220–2,200 | 200 |
| S. paradysenteriae 131 | 1 | 4 | 4 | 7.5 | <0.5 | <5 | 2–6 | 4 |
| K. pneumoniae 132 | 2 | 7 | 2 | 4 | 0.5–1.0 | <5 | 1 | <2 |
| S. paratyphi A 134 | 2–5 | 6–65 | 38–192 | 75–375 | 5–10 | 10 | 2–6 | 20–40 |
| S. pullorum 136 | 2–5 | 6–65 | 38 | 75 | 10 | 10 | 6 | 40–200 |
| S. paratyphi B. 139 | 2–5 | 6–65 | 38–192 | 75–375 | 5–10 | 5 | 22–110 | 20–40 |
| E. coli 21 | 2–5 | 6–65 | 19–38 | 37 | 10 | 10 | 6 | 20–40 |
| A. aerogenes 2 | 0.2–1.0 | 2 | <0.5 | <4 | 0.5 | <5 | 2–6 | 2–4 |
| Proteus Sp. 1 | 20–40 | 130–190 | 384–3,840 | 750–7,500 | 10 | 10 | 6–11 | 4–12 |
| Monilia albicans 8 | >60 | >190 | >11,000 | >22,000 | >3,000 | >1,000 | 22–110 | >12,000 |
| S. aureus 3 | 1–2 | 4–5 | <0.5 | 4 | 5–10 | 10 | 6–11 | 2–4 |
| S. albus 5 | 1 | 4 | 38–192 | 75 | 5–10 | 10 | 6–11 | 2–4 |
| B. subtilis 7 | >60 | >65 | 38–192 | 7.5–75 | 1–5 | <5 | 22–110 | 12 |
| B. mycoides 18 | 0.2 | .6 | <0.5 | <4 | 1–5 | <5 | 110–220 | 12–20 |
| B. subtilis 219 | 0.2–1.0 | .6–3 | <0.5 | <4 | 1–5 | <5 | 1–2 | <2 |

[1] Terramycin—Crude material prepared as in Example II of this application, the product precipitated at pH 9 being filtered, resuspended in water and dried from the frozen state.
[2] Aureomycin—Crystalline hydrochloride.
[3] Chloramphenicol—Crystalline.
[4] Streptothricin—Streptothricin Sulphate (ex crystalline helianthate, 800 Streptomycin u./mg.)
[5] Streptomycin—Streptomycin Sulfate, 750 Strep. u./mg.

Of additional interest is the activity evidenced against a series of microorganisms when the crystalline form of the antibiotic is employed. The following table gives the results obtained. It will be appreciated that any variations between the results with the crude material and the crystalline product may be attributable to impurities present in the crude material.

TABLE II

*Weight of crystalline Terramycin causing complete inhibition of test organism*

| Species: | Mcg./ml. |
|---|---|
| A. aerogenes | 1.0 |
| Klebsiella pneumoniae | 3.0 |
| E. coli | 5.0 |
| Salmonella typhosa | 3.0 |
| S. paratyphi | 1.0 |
| S. schottmuelleri | 1.0 |
| S. paradysenteriae | 1.0 |
| S. pullorum | 10.0 |
| B. subtilis (FDA 219) | 3.0 |
| Staph. albus | 1.0 |
| Staph. aureus | 1.0 |
| M. albicans | 1000 |
| Proteus sp | >1000 |
| Ps. aeruginosa | 100 |
| Brucella bronchisepticae | 3.0 |

Another method for distinguishing Terramycin from other antibiotics is by its action on strains of bacteria made resistant to various antibiotics by serial transfer into broths containing progressively greater concentrations of the antibiotics relative to the original strain that is sensitive to all of the antibiotics. In the following experiment a sterile 12 mm. disc of filter paper was dipped into a Terramycin culture broth and placed at the center on the surface of a nutrient agar plate. From the disc were streaked out cultures of A. aerogenes (1) sensitive to Chloramphenicol, Streptomycin and Streptothricin, (2) resistant to Streptomycin, (3) resistant to Streptothricin, (4) resistant to Chloramphenicol. After 18 hours' incubation at 37° C., zones of inhibition were displayed against all cultures except that which was Chloramphenicol resistant, thus distinguishing Terramycin from Streptomycin and Streptothricin. Terramycin was then distinguished from Chloramphenicol by polarigraphic analysis in which the characteristic half wave of Chloramphenicol (at pH 4.5, ca. −0.85 volt against the mercury pool, but standardized internally) was not displayed.

The toxicity of Terramycin may be estimated relative to other antibiotics from the following considerations: A Terramycin preparation assaying 255 Chloramphenicol u./mg. and 2000 Streptomycin u./mg., was found to have an $LD_0$ of 3.5 mg., when injected intravenously into a 20 gram mouse, equivalent to 0.893 mg. of Chloramphenicol and 7 mg. of Streptomycin. These antibiotics have an $LD_0$ for a 20 gram mouse respectively of 0.6 mg. and 2.5 mg. Crystalline Terramycin used intravenously has an $LD_0$ of 3.0 mg. per 20 gram mouse and an $LD_{50}$ of 4.0 mg. per 20 gram mouse. In other tests it was found that the intravenous $LD_0$ for Terramycin hydrochloride is equivalent to 103 mg. of the crystalline amphoteric compound per kilogram of body weight in mice, while the $LD_{50}$ is equivalent to 192 mg. per kilogram. It is apparent that the impurities present in the crude Terramycin used above have about the same toxicity as has the antibiotic itself.

Terramycin may be distinguished from Aureomycin by its solvent extraction pattern. A solution of Aureomycin at pH 2.0, 6.5 or 9.0 when extracted by ether, n-butanol, ethyl acetate, methyl isobutyl ketone, benzene or chloroform loses its activity, whereas a solution of Terramycin (crude) is extractable only with n-butanol. Likewise, the heat stability of the two antibiotics differs.

TABLE III

| pH | Per cent of original activity | | |
|---|---|---|---|
| | 100° C. for 15 minutes | | 25° C. for one hour |
| | Terramycin (crude) | Aureomycin | Terramycin (crude) |
| 2.0 | 40 | 80 | 100 |
| 6.5 | 50 | <25 | 100 |
| 9.0 | 80 | <25 | 100 |

The behavior of several antibiotics on paper chromatograms using two different solvent systems, run at 28° C. for 24 hours, was compared, using B. subtilis as a test organism.

TABLE IV

*RF values*

SYSTEM

| Water saturated with n-butanol+2% p-toluenesulfonic acid+2% piperidine | Water saturated with n-butanol |
|---|---|
| Terramycin—extended 0.0–0.5 | extended 0.0–0.1. |
| Aureomycin—extended 0.0–1.0 | extended 0.0–0.5. |
| Chloramphenicol—1.0 | 1.0. |
| Streptomycin A—0.2 | 0.0. |
| Streptothricin—0.03 | 0.0. |

This invention embraces a process for growing a new and hitherto undescribed species of microorganism, S. rimosus, preferably at 24–30° C. under submerged conditions of agitation and aeration, on media consisting of a carbohydrate source, such as sugars, starch, glycerol; an organic nitrogen source, such as soybean meal, wheat gluten, cottonseed meal, lactalbumin, an enzymatic digest of casein, tryptone; a source of growth substances, such as distillers' solubles, yeast extract; mineral salts, such as sodium chloride, potassium phosphate, magnesium sulphate, sodium nitrate; a buffering agent, such as calcium carbonate; and vegetable oil. After growth has been completed, the mycelium is separated from the broth now containing the antibiotic Terramycin, and the Terramycin is recovered from the broth by means of extraction with organic solvents at a suitable pH, or by adsorbing the antibiotic from the broth onto activated carbon and eluting it from the carbon by means of organic solvents or water at a suitable pH, or by other means well known to the art. The new antibiotic, Terramycin, produced as aforesaid, possesses unique and valuable properties which distinguish it from all known and previously described antibiotics.

Inoculum may be obtained by employing a growth from slants or Roux bottles inoculated with S. rimosus. Solid media suitable for this initial growth are beef lactetose or Emerson's agar. This growth is used to inoculate either shaken flasks or submerged inoculum tanks; or alternatively, the inoculum tanks are inoculated from the shaken flasks. Any shaken flask growth will generally have reached its maximum in 4 days, whereas inoculum in submerged inoculum tanks will usually be at the most favorable period in 2 days. From the inoculum tank the broth containing the microorganism is forced into the fermenter under completely aseptic conditions, and growth is continued for a further period of 2 days. At all times aeration is maintained in the tanks by blowing in sterile air through a sparger at the rate of ½–2 volumes of free air per volume of broth per minute. If difficulty is experienced in preventing the rise of the foam within the tank, antifoaming agents, such as vegetable or animal oils, or other similar agents may be added to break up the foam. While the broth is agitated at a speed depending upon the type of agitator, completely aseptic conditions are maintained and the temperature of the agitated broth is maintained between 24–30° C.

Terramycin may be recovered from the fermentation broth in which it is formed by several different procedures. The mycelium in the fermentation broth must first be removed, and it has been found that this is best done by making the mixture acid, preferably below pH 4, and then filtering out the mycelium. If this pH adjustment is not made, part of the antibiotic is left on the mycelium.

Terramycin may be recovered in a purified form by treating the filtered fermentation broth with activated carbon at a pH near neutrality. The antibiotic may be eluted from the adsorbent by means of water saturated with a partially water miscible alcohol, such as butanol, and adjusted to pH 1.5 with an acid, such as hydrochloric acid. After filtering out the eluted adsorbent, the pH of the filtrate may be adjusted to pH 6–9 and solid Terramycin recovered by drying from the frozen state under vacuum. Rather than drying the filtrate, the antibiotic may be extracted therefrom into butanol after adjusting to about pH 9. The butanol extract may then be concentrated to obtain a purified Terramycin or the butanol extract may in turn be extracted with an aqueous acid, such as dilute hydrochloric acid. After separation of the aqueous phase, its pH may be adjusted to pH 6–9 by the addition of a base or by treatment with an anion exchange material, such as Amberlite IR4 (a commercially available, water-insoluble, resinous condensation product of a phenol, formaldehyde and an alkylene polyamine).

Rather than adsorbing Terramycin from the filtered broth on a solid adsorbent, the antibiotic may be extracted therefrom into certain solvents at a basic pH, preferably about 9. The solvents that may be used include butanol, amyl alcohol and phenylcellosolve. It has also been found that Terramycin may be extracted at an acidic pH, preferably below 3.5. Phenylcellosolve may be used for this purpose. After extraction of Terramycin from the filtered broth at pH 9 with butanol, the solvent may be concentrated under vacuum to a fraction of its original volume. Upon extraction of the butanol concentrate with dilute acid, separation of the phases, and adjustment of the aqueous phase to pH 6–7, solid Terramycin separates. This product may be filtered and dried whereupon it has a potency of about 600 micrograms of pure Terramycin per milligram.

In order to measure the potency of the purified products, pure crystalline Terramycin dihydrate, prepared as hereinafter described, is taken as a standard, with a potency designated as 1000 micrograms per milligram (mcg./mg.). The assay uses as a test organism *Klebsiella pneumoniae* PCI 602, and as a test medium Baltimore Biological Laboratory antibiotic assay broth, prepared according to the Food and Drug Administration formula for Streptomycin turbidimetric assay broth. The method of test is that of McMahan, J. R. (J. Biol. Chem., vol. 153, pages 249–258, April 1944). Pure crystalline Chloramphenicol may also be used as a standard for comparison, and it is found that each milligram of crystalline Terramycin dihydrate has the equivalent in potency of 3.15 milligrams of crystalline Chloramphenicol.

Crystalline Terramycin may be obtained from the amorphous solid material, such as that produced by the recovery procedure detailed above (potency about 600–650 mcg./mg.). This is accomplished by adjusting the crude material in water to pH 2.8 with an acid, such as hydrochloric acid, filtering the resulting solution, and partially evaporating the solution under vacuum. The crystals that separate are filtered, washed and dried. They assay 850–900 mcg./mg.

In another procedure for obtaining crystalline Terramycin, the crude antibiotic assaying about 670 mcg./mg. is dissolved in dilute hydrochloric acid at pH 2.5. The aqueous solution is filtered and treated with sodium chloride and slightly more than one-half of its volume of butyl alcohol. After shaking the mixture thoroughly, the solid that separates is filtered. It is redissolved in methanol, and a small volume of water is added. After storing overnight in a refrigerator, the crystals formed are filtered, washed and dried. Crystalline material obtained in this way assays about 860 mcg./mg. and consists of Terramycin combined with calcium chloride.

A further method for obtaining crystalline Terramycin consists in subjecting amorphous material assaying about 650 mcg./mg. to a counter-current distribution after the manner of Craig (J. Biol. Chem. 155 519 (1944)). The solvent system used is water adjusted to pH 3 with hydrochloric acid and butyl alcohol. The aqueous phase of selected tubes was evaporated under vacuum to obtain white, prismatic crystals of Terramycin, assaying about 950 mcg./mg.

Various salts of Terramycin may be prepared, most simply by adding the desired acid, mineral or organic, to the antibiotic in water until a clear solution is obtained. The solid salts may be prepared by adjusting the pH of such a solution of a Terramycin salt to a point just below that at which the antibiotic would begin to separate (about 2.5). The solution may then be dried, as by subjecting the frozen solution to a vacuum. Acid salts of Terramycin are obtained by evaporation of a solution of the salt in water at a low pH. Mineral acids which may be used are hydrochloric acid, sulfuric acid and phosphoric acid. Organic acids which may be used are citric acid, tartaric acid, gluconic acid, and so forth. Since Terramycin is amphoteric, salts of various metallic elements with the antibiotic may be prepared, in particular, the alkali metal salts of Terramycin are formed by treating an aqueous suspension of the antibiotic with an alkaline hydroxide. The solid metal salts of Terramycin are obtained by the evaporation under vacuum of an aqueous solution of the antibiotic at the proper pH.

Various other methods may be used for purifying Terramycin. The antibiotic may be extracted from the filtered fermentation broth as a salt with one of a group of organic sulfonic acids. It may be precipitated from acid aqueous solutions of the crude material with picric acid. Terramycin may also be precipitated from a dilute solution of the crude material by means of an arylazosulfonic acid at a low pH, for example, Orange II at pH 2. Terramycin may be recovered from the dye salt by reagents such as barium chloride, which precipitates the barium salt of the dye leaving a solution of Terramycin which may be dried. That other metallic salts would work as well is obvious. The potency and color of impure Terramycin may be improved by dissolving it in dilute mineral acid and adding ammonium β-naphthalene sulfonate solution. The dark-colored precipitate is filtered and the pH of the filtrate is raised to obtain a precipitate of Terramycin of improved color and potency.

Terramycin, when crystallized from its aqueous solutions or solutions containing some water, is recovered in the hydrated form, generally as the dihydrate. The anhydrous form may readily be prepared by heating the hydrated forms under vacuum or by crystallization from a substantially anhydrous solvent.

Terramycin dihydrate crystallizes in several forms, depending upon the procedure used in its preparation. One of these forms consists of thick six-sided plates and a second of thick needles. The refractive indices of the first of these forms are $\alpha = 1.634 \pm .004$, $\beta = \pm 1.646 \pm .004$, $\gamma =$ greater than 1.700. These crystals exhibit parallel extinction; they are biaxial positive and the optical angle is less than 40°. The optical rotation of a solution of the pure crystalline compound in methanol decreases rapidly on standing at room temperature. If the specific rotation is read shortly after the solution is prepared, it has the following value $[\alpha]_D^{25} = +26°$ (0.5% in methanol). The addition of calcium chloride to the methanolic solution causes the specific rotation to change markedly to a high negative value. The crystalline combination of Terramycin and calcium chloride also has a high negative specific rotation in methanol. The specific rotation in dilute hydrochloric acid is $[\alpha]_D^{25} = -196°$ (0.5% in N/10 hydrochloric acid).

When the ultraviolet absorption spectrum of a sample of crystalline Terramycin dihydrate is determined (Beckman Quartz Spectrophotometer—Model DU) in dilute aqueous solution, M/10 in potassium dihydrogen phosphate (pH 4.5), in 1.00 centimeter cells, the following maxima are found:

$E_{1\ cm.}^{1\%}$ at 353 mμ = 301

$E_{1\ cm.}^{1\%}$ at 276 mμ = 322

$E_{1\ cm.}^{1\%}$ at 249 mμ = 240

When the ultraviolet absorption spectrum of the antibiotic is determined in dilute phosphoric acid at pH 1.7, the following are the maxima:

$E_{1\ cm.}^{1\%}$ at 353 mμ = 277

$E_{1\ cm.}^{1\%}$ at 268 mμ = 379

Terramycin is an amphoteric compound containing weakly basic and weakly acidic groups. It contains the elements carbon, hydrogen, nitrogen, and oxygen. Chemical analyses of the crystalline dihydrate averaged 53.05% carbon, 5.91% hydrogen, 5.64% nitrogen, and 35.4% oxygen (by difference). The material is ash-free. It has a melting point of approximately 185° C. with some decomposition occurring at that temperature. It is soluble in methanol, ethanol, acetone and propylene glycol, in water to the extent of 0.25 mg. per ml. at 25° C., and it is insoluble in ether and petroleum ether.

A suspension obtained by mulling crystalline Terramycin dihydrate in mineral oil shows many characteristic absorption bands in the infrared. Among these are the following frequencies (in reciprocal centimeters): 3580, 3470, 3350, 3060, 1652, 1625, 1592, 1318, 1280, 1242, 1122, 1090, 1076, 1054, 1033, 1007, 938, 863, 840, 775, 708, and 679. The infrared absorption spectrum of this mineral oil mull within the characteristic region of wave numbers between 1350 and 625 cm.$^{-1}$ is shown in Fig. 1 of the accompanying drawings. Another such infrared absorption spectrum of a mineral oil mull of the Terramycin hydrochloride salt is illustrated in Fig. 2.

The infrared absorption spectrum of a suspension of the free Terramycin dihydrate in mineral oil shows general absorption in the region from about 2500 to 3600 cm.$^{-1}$, and also shows individual bands (transmission minima) at about 3470 and 3580 cm.$^{-1}$ characteristic of O-H groups, at 3350 cm.$^{-1}$ characteristic of O-H or N-H groups, and at 3060 cm.$^{-1}$ characteristic of aromatic C-H groups. A large band at about 2900 cm.$^{-1}$, as well as bands at 1380 and 1460 cm.$^{-1}$, are the result of infrared absorption by the mineral oil, as is well known to those who use this suspension medium. The Terramycin dihydrate suspension further shows bands at 1592, 1625 and 1652 cm.$^{-1}$ of considerable intensity, that are probably associated with amide carbonyl linkages, conjugated carbonyls or conjugated carbon-carbon double bonds. At 1242 cm.$^{-1}$ there is a band that may be aromatic O-H, and at 708, 775 and 840 there occur bands characteristic of a multiply-substituted aromatic nucleus. Additional bands of unascertained origin occur at various places throughout the spectrum, such as a relatively prominent pair at 1007 and 1033 cm.$^{-1}$.

The infrared absorption spectrum of a suspension of Terramycin hydrochloride in mineral oil shows general absorption in the region 2300 to 3600 cm.$^{-1}$ with a broad band characteristic of O-H group and N-H group absorption in the region from 3200 to 3400 cm.$^{-1}$. There are bands at 1574, 1619, 1635, and 1669 cm.$^{-1}$, that may possibly belong to amide carbonyl groups, to conjugated carbonyl groups, to conjugated carbon-carbon double bonds or to some combination of these. At 1220 and 1240 cm.$^{-1}$ there is a double band, the upper component of which is possibly aromatic O-H. Additional bands of unascertained origin occur at various places throughout the spectrum, such as the relatively prominent band at 943 cm.$^{-1}$.

The above properties show Terramycin to be distinctly different from any of the known antibiotics.

The following examples are given as illustrations of the manner in which Terramycin may be formed, recovered, concentrated, purified, and finally converted to pure, crystalline form. Crystalline Terramycin and crystalline salts of Terramycin are of particular value because of their high purity and efficacy. The examples given are merely illustrative and are not to be construed as limiting our invention. A strain of *Streptomyces rimosus* designated as isolate Number S3279 was used throughout.

EXAMPLE I

*Formation and recovery of Terramycin*

Medium:                                Grams
    Soybean meal _____ 10
    Cerelose _____ 10
    Distillers' solubles_____ 0.5
    Sodium chloride_____ 5
Distilled water to 1000 ml.
pH adjusted to 7.0 with sodium hydroxide and calcium carbonate was added at the rate of 1 gram/liter.

Five hundred ml. portions of the above medium were added to Fernbach flasks which were then sterilized at 121° C. for 30 minutes. Upon cooling, the flasks were inoculated with a suspension of the growth of S. rimosus obtained from the surface of beef lactose agar slants, and the flasks were shaken for 4 days at 28° C. on a rotary shaker having a displacement of 2" at an R. P. M. of 200. At the end of this period the broth was found to contain 640 CDU/ml. and 400 Chloramphenicol u./ml. The mycelium was separated from the broth by filtration, and the latter was adjusted to pH 9.0. The antibiotic was extracted from the broth with n-butanol, and when the ultra-violet absorption spectrum was observed on the butanol solution of the antibiotic, peaks in the absorption curve were found at 385 and 270 millimicrons.

EXAMPLE II

*Formation and recovery of crude Terramycin*

Medium:

| | Grams |
|---|---|
| Soybean meal | 30 |
| Corn starch | 5 |
| N-Z-Amine B (enzymatic digest of casein) | 1 |
| Sodium nitrate | 3 |

Tap water to 1000 ml.
pH was adjusted to 7.0 and 5 grams of calcium carbonate were added to each liter.

Two liter portions of such a medium were dispensed into several one-gallon glass jars containing agitators and spargers for the admission of sterile air. The apparatus and medium were sterilized at 121° C. for one hour. After cooling, they were inoculated with 50 ml. of a suspension of S. rimosus. After 40 hours' stirring at 1800 R. P. M., the broth was found to contain 1600 Chloramphenicol u./ml. and 1280–2560 CDU/ml. Seven liters of broth prepared as described above were separated from the mycelium by filtration and adjusted to pH 7.0. Seventy grams of Norit A (an activated carbon) were added, and the whole stirred at room temperature for one hour. The spent broth was separated from the carbon now containing the antibiotic by filtration, and the cake was washed with distilled water. The antibiotic was eluted from the activated carbon with one liter of distilled water saturated with n-butanol and adjusted to pH 1.5 with hydrochloric acid. The eluate was adjusted to pH 9.0 and extracted with one liter of n-butanol. The butanol layer was separated from the aqueous phase and extracted with $\frac{1}{10}$ normal hydrochloric acid. The acid aqueous layer was separated from the butanol and brought back to pH 5.0 by stirring with Amberlite IR-4 (an anion exchange resin). The ion exchange resin was separated from the antibiotic solution by filtration, and the latter was freeze dried giving 2.0 grams of a yellowish-brown amorphous powder. This preparation assayed 255 Chloramphenicol units/mg. and 2000 Streptomycin u./mg.

EXAMPLE III

*Formation of Terramycin*

Inoculum medium:

| | Per cent |
|---|---|
| N-Z-Amine B (enzymatic digest of casein) | 1 |
| Cerelose | 1 |
| Yeast extract | 0.5 |
| Sodium chloride | 0.5 |
| Calcium carbonate | 0.1 |

In tap water and pH adjusted to 6.7 with KOH.

Two hundred and fifty gallons of the above medium were made up in a 400 gallon inoculum tank and maintained at 121° C. for one hour. After cooling to 28° C. the medium was inoculated with one liter of a suspension of S. rimosus. The tank was aerated and agitated for a period of 25 hours at which time it was used to inoculate the fermenter. The fermenter medium was composed as follows:

| | Per cent |
|---|---|
| Soybean meal | 3 |
| Corn starch | 0.5 |
| N-Z-Amine B | 0.1 |
| Sodium nitrate | 0.3 |
| Calcium carbonate | 0.5 |
| Vegetable oil | 0.4 |

In tap water, pH adjusted to 7.0 and sterilized by maintaining at a temperature of 121° C. for 1 hour.

After cooling to 28° C., the fermenter medium was inoculated with the contents of the inoculum tank described above. At the end of 47 hours the pH had risen to 8.0, and the broth was found to have a potency of 335 Chloramphenicol units or 280 CDU/ml.

EXAMPLE IV

*Recovery of Terramycin from broth by adsorption*

Seven liters of a Terramycin fermentation broth, filtered from the fermentation mycelium at a pH less than 4, and assaying 190 mcg./ml., were adjusted to pH 7, and 70 g. of Norit A (an activated carbon manufactured by the American Norit Company) were added. After stirring for one hour, the carbon was filtered and washed with water. Terramycin was eluted from the adsorbent by means of water saturated with butanol and adjusted to pH 1.5 with hydrochloric acid. The eluate was adjusted to pH 9, and then the antibiotic was extracted into butanol. The butanol phase was reextracted with a small volume of N/10 hydrochloric acid, and the pH of the aqueous solution was adjusted to 5 by means of Amberlite IR-4 (a synthetic anion exchange resin). The Terramycin was then recovered as a solid by drying the aqueous solution from the frozen state. It weighed 1.50 g. and assayed about 80 mcg./ml.

EXAMPLE V

*Recovery of Terramycin from broth by extraction*

Eight liters of a Terramycin fermentation broth were adjusted to pH 2.5 with sulfuric acid and the mycelium was filtered. The filtrate contained 2,400,000 mcg. of Terramycin. It was adjusted to pH 9 and extracted with three liters of butanol in several portions, and the combined extracts contained 1,600,000 mcg. of the antibiotic. The butanol extracts were concentrated under vacuum to 650 ml. which solution contained 2400 mcg./ml. of Terramycin. The butanol solution was extracted with one liter of N/10 hydrochloric acid in several portions, and the combined aqueous phases were adjusted to pH 7.5 with dilute sodium hydroxide. The precipitated product was filtered and dried. It weighed 1.69 g. and had a potency of 625 mcg./mg. of Terramycin.

EXAMPLE VI

*Preparation of crystalline Terramycin*

Amorphous Terramycin (20 g.) assaying 625 mcg./mg. was dissolved in 400 ml. of water by adding hydrochloric acid until the pH was 2.5. The filtered solution had a volume of 480 ml. and assayed 26,400 mcg./ml. After the addition of 50 g. of sodium chloride and 300 ml. of wet butanol, the mixture was thoroughly shaken. The precipitated solid was filtered and dissolved in 150 ml. of methanol. The methanolic solution assayed 31,000 mcg./ml. Upon addition of 5 ml. of water, crystalline Terramycin began to form. A further 20 ml. of water were added, and the mixture was stored overnight in a refrigerator. The filtered, dried product weighed 5.8 g. It assayed 860 mcg./mg.

EXAMPLE VII

*Preparation of crystalline Terramycin by counter-current distribution*

Amorphous Terramycin assaying 640 mcg./mg. was dissolved in water by adjusting the pH to about 3 with hydrochloric acid. The solution was saturated with butanol and was then subjected to a counter-current distribution with nine separatory funnels, using equal volumes of wet butanol and dilute hydrochloric acid (pH 3) saturated with butanol. Each of the aqueous and butanol phases were checked for potency and the aqueous phases of funnels 6 and 7 were selected. These were combined and concentrated under vacuum to a small volume. The white crystals that separated were centrifuged and washed with water, acetone, and ether, successively. The dried product assayed 954 mcg./mg.

EXAMPLE VIII

*Preparation of the hydrochloride of Terramycin*

Terramycin of any purity may be converted to the hydrochloride by treating the material in water with hydrochloric acid until a clear solution is obtained. The pH of the solution is then adjusted to a value close to 2.5. The solution is frozen and dried under vacuum to give a readily soluble powder.

The X-ray diffraction pattern of the powdered crystalline Terramycin hydrochloride has been determined in a Philips camera of 57.3 mm. radius using copper K alpha radiation.

The following are the approximate crystalline plane spacings (d. in Angstrom units) calculated from the more intense lines recorded on a photographic film and the approximate relative intensity (I) of these, using the most intense line as 1.00.

| I | d. Å. units |
|---|---|
| .9 | 10.32 |
| .8 | 9.39 |
| .6 | 8.30 |
| .2 | 5.26 |
| 1.0 | 4.19 |
| .5 | 3.92 |
| .2 | 3.20 |

EXAMPLE IX

*Preparation of the sodium salt of Terramycin*

Terramycin of any purity may be converted to the sodium salt by treating the material in water with sodium hydroxide until the pH is over 9.5. The solution is then frozen and dried under vacuum to yield the dry sodium salt in the form of a water soluble powder.

In the foregoing examples it is to be understood that the compositions of the culture media are merely illustrative and can be varied within relatively wide limits, as for example, by substituting lactalbumen, linseed meal, cottonseed meal, peanut flour, corn protein, wheat gluten, etc. for the soybean meal. Likewise, the conditions of fermentation, such as agitation, aeration rates, temperature, etc. can be varied to a considerable extent. Furthermore, many alternative methods and variations of those described for recovering, concentrating and purifying the antibiotic and its salts, will occur to those skilled in the art. Such an alternative recovery method would be to adsorb the antibiotic directly from the fermentation broth on ion exchange resins.

As is the case with Aureomycin and Chloramphenicol, Terramycin is active in vivo as well as in vitro and displays marked chemotherapeutic activity against experimental infection in mice due to *Streptococcus hemolyticus, D. pneumoniae, K. pneumoniae, S. typhosa* and other organisms. Terramycin possesses definite antirickettsial activity in the embryonated hen's egg, and in high concentrations it inhibits the infection of the chick embryo with the PR8 strain of influenza A virus.

Our novel antibiotic, as may be seen from the foregoing data, is of great value in the treatment of various infections in humans and animals. It may be administered by parenteral injection, orally or topically in customary dosage forms.

Modifications may be made in carrying out this present invention without departing from the spirit and scope thereof, and the patent protection obtained is only to be limited by the express language of the appended claims.

We claim:

1. A process for producing Terramycin, which comprises cultivating a strain of *Streptomyces rimosus* in an aqueous nutrient-containing, carbohydrate solution under submerged aerobic conditions until substantial antibacterial activity is imparted to said solution, and then recovering the so produced Terramycin from the fermentation broth.

2. A process for producing Terramycin, which comprises cultivating a strain of *Streptomyces rimosus* in an aqueous nutrient-containing, carbohydrate solution under submerged aerobic growth conditions at a temperature of from about 24° C. to about 30° C. for a period of from about 2 days to a week, and then recovering the so produced Terramycin from the fermentation broth.

3. A process as claimed in claim 1, wherein the recovery of the Terramycin includes the step of adsorption upon activated carbon.

4. A process as claimed in claim 1, wherein the recovery of the Terramycin includes the step of extracting the antibiotic into a water immiscible organic solvent selected from the group consisting of butanol and amyl alcohol under slightly alkaline conditions.

5. A process as claimed in claim 1, wherein the recovery of the Terramycin includes the step of extracting the antibiotic into a water immiscible organic solvent selected from the group consisting of butanol and amyl alcohol under strongly acid conditions.

6. A process for producing a Terramycin fermentation broth, which comprises cultivating a strain of *Streptomyces rimosus* in an aqueous, nutrient-containing, carbohydrate solution under aerobic conditions, until substantial antibacterial activity is imparted to said solution.

7. A process as claimed in claim 2, wherein the recovery of the Terramycin includes the step of extracting the antibiotic into butanol at a pH of about 9.

8. A process as claimed in claim 2, wherein the fermentation broth is filtered to remove the mycelium, the filtrate is adjusted to a pH of about 9 and extracted with a water-immiscible, organic solvent of the group consisting of butanol and amyl alcohol the organic solvent extract is extracted with dilute aqueous acid, the aqueous acid extract is neutralized, and the product thereby precipitated is filtered.

9. A substance effective in inhibiting the growth of Gram positive and Gram negative bacteria, selected from the group consisting of an amphoteric substance capable of forming salts with acids and metals, that is sparingly soluble in methanol and substantially insoluble in water and in ether, whose dihydrate contains the elements carbon, hydrogen, nitrogen and oxygen in the following proportions:

$C = 53.05\%$
$H = 5.91\%$
$N = 5.64\%$
$O = 35.4\%$ (by difference)

and may possess a crystalline form consisting of thick, six-sided plates having the following refractive indices:

$\alpha = 1.634 \pm .004$
$\beta = 1.646 \pm .004$
$\gamma = $ greater than 1.700, and a suspension of whose dihydrate in mineral oil exhibits characteristic absorption in the infrared region of the spectrum at the following frequencies expressed in reciprocal centimeters: 3580, 3470, 3350, 3060, 1652, 1625, 1592, 1318, 1280, 1242, 1122, 1090, 1076, 1054, 1033, 1007, 938, 863, 840, 775, 708, 679, and the acid and metal salts of said substance.

10. An amphoteric substance effective in inhibiting the growth of Gram positive and Gram negative bacteria and capable of forming salts with acids and metals, that is sparingly soluble in methanol and substantially insoluble in water and in ether, whose dihydrate contains the elements carbon, hydrogen, nitrogen, and oxygen in the following proportions:

$C = 53.05\%$
$H = 5.91\%$
$N = 5.64\%$
$O = 35.4\%$ (by difference)

and may possess a crystalline form consisting of thick, six-sided plates having the following refractive indices:

$\alpha = 1.634 \pm .004$
$\beta = 1.646 \pm .004$
$\gamma = $ greater than 1.700, and a suspension of whose dihydrate in mineral oil exhibits characteristic absorption in the infrared region of the spectrum at the following frequencies expressed in reciprocal centimeters: 3580, 3470, 3350, 3060, 1652, 1625, 1592, 1318, 1280, 1242, 1122, 1090, 1076, 1054, 1033, 1007, 938, 863, 840, 775, 708, 679.

11. A hydrochloride of the amphoteric substance defined in claim 10.

12. A sodium salt of the amphoteric substance defined in claim 10.

13. A process as claimed in claim 1, wherein the recovery of the Terramycin includes the step of extracting the antibiotic into phenyl cellosolve under slightly alkaline conditions.

14. A process as claimed in claim 1, wherein the recovery of the Terramycin includes the step of extracting the antibiotic into phenyl cellosolve under strongly acid conditions.

15. A process as claimed in claim 2, wherein the fermentation broth is filtered to remove the mycelium, the filtrate is adjusted to a pH of about 9 and extracted with phenyl cellosolve, the organic solvent extract is in turn extracted with dilute aqueous acid, the aqueous acid extract is neutralized, and the product thereby precipitated is filtered.

BEN A. SOBIN.
ALEXANDER C. FINLAY.
JASPER H. KANE.

REFERENCES CITED

The following references are of record in the file of this patent:

UNITED STATES PATENTS

| Number | Name | Date |
|---|---|---|
| 2,476,085 | Dimick | July 12, 1949 |
| 2,482,055 | Duggar | Sept. 13, 1949 |
| 2,483,871 | Bartz | Oct. 4, 1949 |

OTHER REFERENCES

Waksman: "Streptomycin," 1949, pages 33–45. Copy in Patent Office Library.

Finlay et al., in Science, Jan. 27, 1950, page 85. Copy in Patent Office Library.

Bailey on "Antibiotics" in Annual Review of Microbiology, vol. II, 1948, page 143. Copy in Division 43.

Certificate of Correction

Patent No. 2,516,080  July 18, 1950

BEN A. SOBIN ET AL.

It is hereby certified that error appears in the printed specification of the above numbered patent requiring correction as follows:

Columns 3 and 4, Table I, third column thereof, opposite "Ps. aeruginosa 173_____", for ">65" read <*65*; column 6, line 62, for "lacetose" read *lactose*; and that the said Letters Patent should be read as corrected above, so that the same may conform to the record of the case in the Patent Office.

Signed and sealed this 12th day of December, A. D. 1950.

[SEAL]

THOMAS F. MURPHY,
*Assistant Commissioner of Patents.*